Feb. 12, 1935. T. F. PHILIPPI 1,990,668
POLISHING MACHINE
Filed Oct. 27, 1932   7 Sheets-Sheet 4

Patented Feb. 12, 1935

1,990,668

UNITED STATES PATENT OFFICE 1,990,668

POLISHING MACHINE

Theodore F. Philippi, East St. Louis, Ill.

Application October 27, 1932, Serial No. 639,813

14 Claims. (Cl. 51—138)

This invention relates to polishing machines, particularly to machines for polishing flat metallic sheets or plates. The invention has for its principal object to provide a polishing machine that will produce a brilliant luster evenly over the entire surface of a sheet, even though the surface of the sheet may not be entirely flat.

The invention consists principally in a polishing machine including a polishing unit which is movable back and forth over the surface of the work to be polished and which comprises a polishing belt for engaging such surface and a buffer wheel of comparatively yieldable material for pressing a portion of the polishing belt flat against the surface of the work. The invention further consists in a polishing machine including a plurality of such polishing units which are arranged so that the operation of any one of the units may be stopped for the purpose of replacing a polishing belt without interfering with the operation of the others. The invention also consists in the polishing machine, and in the parts and combinations and arrangements of parts hereinafter described and claimed.

In the accompanying drawings which form part of this specification and wherein like reference symbols refer to like parts wherever they occur.

In the accompanying drawings is shown a polishing machine embodying my invention and mounted on a framework comprising a front longitudinal base member 1, a rear longitudinal base member 2, and an intermediate longitudinal base member 3, which base members are connected together by suitable cross members. The front longitudinal base member 1 has a row of spaced uprights 4 fixed thereon; the intermediate base member 3 has a row of uprights 5 fixed thereon; and the rear longitudinal base member 2 has a row of uprights 6 fixed thereon which extend higher than the rear and intermediate ones.

The rear uprights 6 are connected together at their upper ends by a longitudinal brace 7; and the front, intermediate, and rear uprights, at each end of the rows of uprights, are connected together by a diagonal cross brace 8.

Each end of the front and intermediate longitudinal base members is provided with a horizontal bearing 9, and a horizontal shaft 10 having a plurality of sprockets 11 fixed thereto is mounted in the bearings 9 at each side of the machine. Mounted around the sprockets 11 are endless sprocket chains 12 carrying flat cross members 13 and constituting an apron conveyor belt whose lower reach is supported at intervals by rollers 14 extending between and mounted on the front and intermediate longitudinal base members, and whose upper reach is supported by cross rods 15 extending between and fixed to the front and intermediate uprights. The upper reach of this apron conveyor belt is adapted to carry the work to be polished, such as a sheet of stainless steel A, through the machine.

Connected to the upper ends of the front uprights 4, to the upper ends of the intermediate uprights 5, and to the rear uprights 6, are horizontally disposed cross angles 16 having flat strips fixed thereon which constitute tracks 17 for a series of movable carriages B. Each carriage comprises side members 18, end members 19 connected thereto, and brackets 20 projecting from the front and rear ends of the side members 18 and carrying rollers 21 arranged to run on the tracks 17. The middle of each side member 18 of the carriage has a plate 22 secured thereto which projects below the carriage tracks 17; and these plates 22 are provided at their lower ends with supports for a cross shaft 23 which has a built-up lever arm structure 24 mounted thereon whose front end has a polishing unit or device C attached thereto, and whose rear end has a motor 25 supported thereon for driving the polishing unit, said motor 25 being of such weight that it almost counterbalances the polishing unit C.

The lever arm structure 24 comprises a hub 26 mounted around the carriage cross shaft 23 and has an integral channel-shaped arm 27 extending upwardly and rearwardly therefrom and between the side members 18 of the carriage. This arm 27 carries a supporting plate 28 on its end for the polishing unit driving motor 25. The hub 26 is provided with a split clamping collar 29 having an arm 30 clamped therein which extends downwardly toward the front end of the machine. The polishing unit C is fixed to the free end of this arm 30 and comprises a shallow V-shaped member 31 for supporting a pulley wheel 32 at its front end and a pulley wheel 33 at its rear end with an endless polishing belt 34 mounted around them. The rear end of the pulley supporting member has a split clamping collar 35 for attaching it to the end of the arm 30. A bearing 36 is provided near the rear end of the supporting member 31. Another bearing 37 in axial alinement with the bearing 36 is provided on the end of an arm 38 extending laterally from the clamping collar 35; and mounted in these bearings is a pulley shaft 39 with a pulley wheel 40 fixed thereon between the two bearings. A belt 41 is mounted around this pulley wheel 40 and a pulley wheel 42 fixed on the armature shaft of the driving motor 25. The pulley shaft 39 has a collar 43 fixed on its end on the outside of the arm bearing 36, and the other end of the pulley shaft extends beyond the other bearing for receiving the rear polishing belt pulley wheel 33 which is held on the shaft by a nut 44 threaded on the end of the shaft. The front end of the pulley supporting member 31 has a cylindrical opening through which extends a cylindrical pin member 45 having a shaft 46 projecting eccentrically from its end for receiving the front polishing belt pulley wheel 32. The pin member opposite the pulley shaft end is provided with a collar 47 having a radial arm 48 extending therefrom to which is attached one end of a chain 49 mounted around the top portion of the collar 47 and having its other end attached to a coil spring 50 which is removably fixed to a bracket 51 secured to the rear end of the pulley supporting member 31 for tensioning the polishing belt. A buffer wheel 52 of comparatively yieldable material is mounted on a stub shaft 53 fixed on the underside of the V-shaped pulley supporting member 31 at its vertex; and this buffer wheel 52 is adapted and arranged to press a portion of the lower reach of the polishing belt flat against the surface of the work sheet. In actual practice, it has been found that a buffer wheel which comprises a series of separate cloth discs 54 mounted on a tubular shaft 55 that has an integral ring 56 around one end of the shaft and a ring 57 threaded around the other end thereof for holding the cloth discs together provides a buffer wheel which is highly satisfactory. The pulley supporting member 31 is also provided with an upright pin 58 for receiving weights 59 for regulating the pressure of the belt against the surface of the work sheet. A suitable hood 60, which may be folded back, is fixed to the pulley supporting member 31 for covering the polishing belt; and a telescoped dust pipe 61 opens into the space within the hood and into a tube 62 provided with a suction fan 63 for keeping the surface of the work sheet clean.

Figure 1:
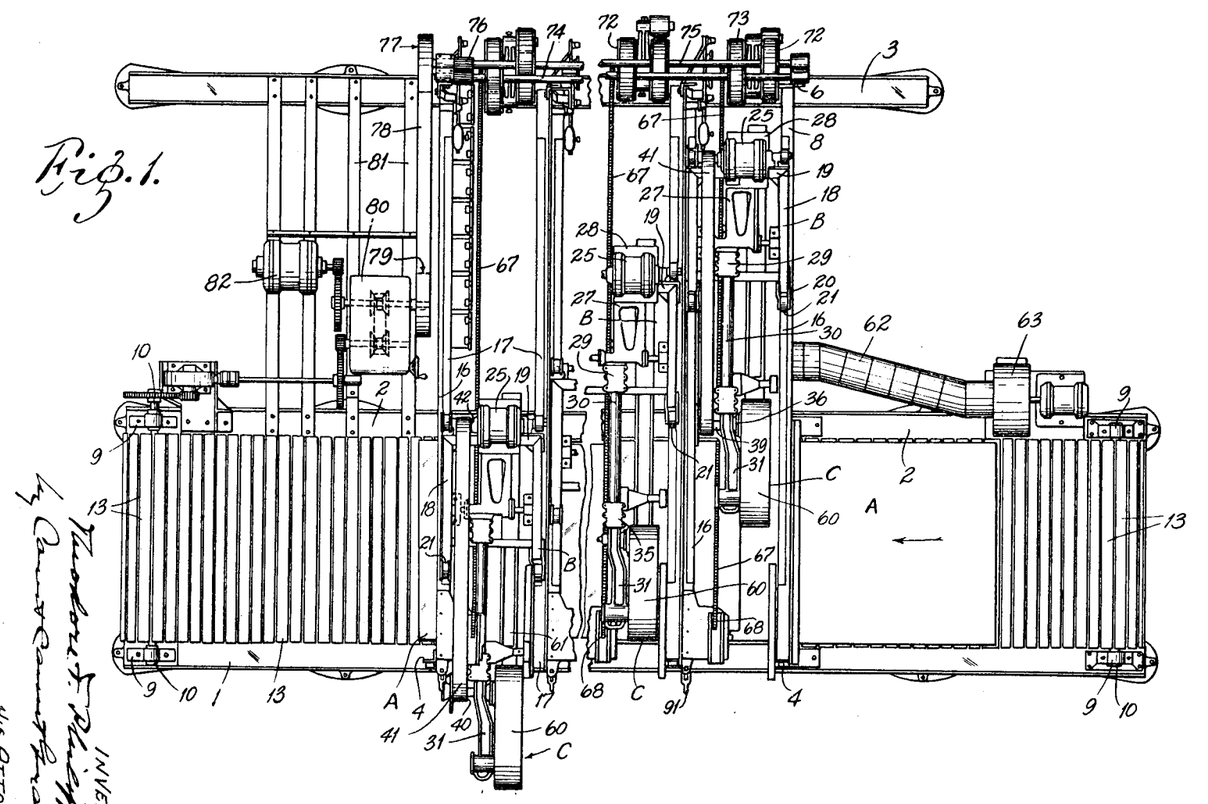
Fig. 1 is a plan view of a polishing machine embodying my invention, with the top parts of the framework of the machine removed.
Figure 2:
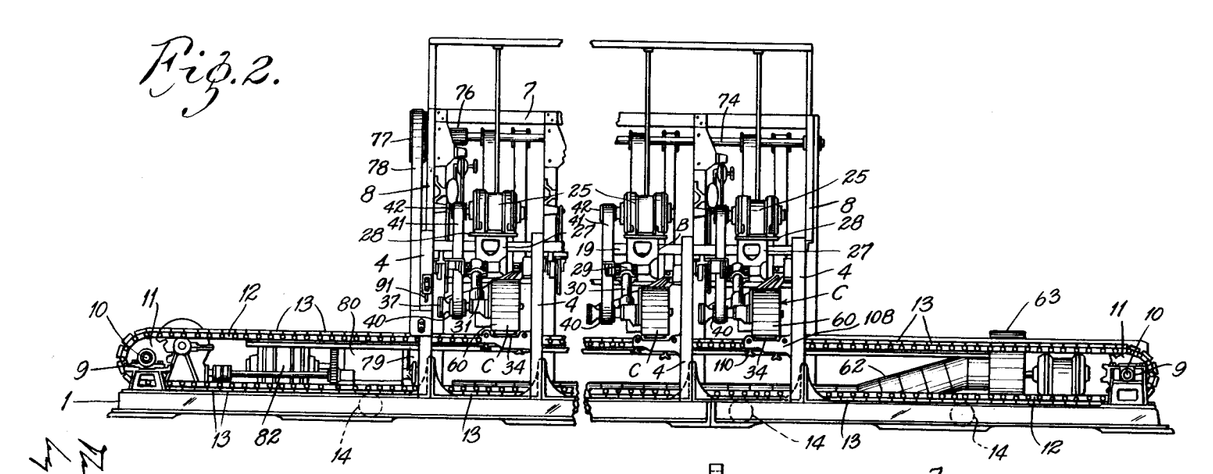
Fig. 2 is a front view of the machine.
Figure 3:
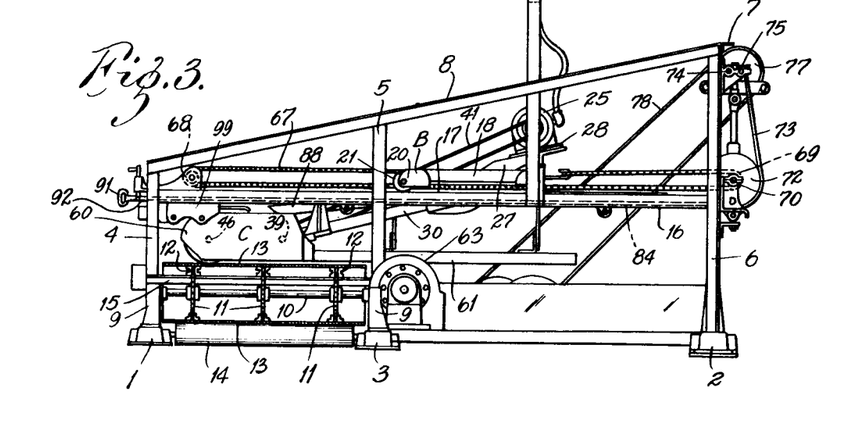
Fig. 3 is a side view of the machine, with the conveyor for carrying the work shown in section.
Figure 4:
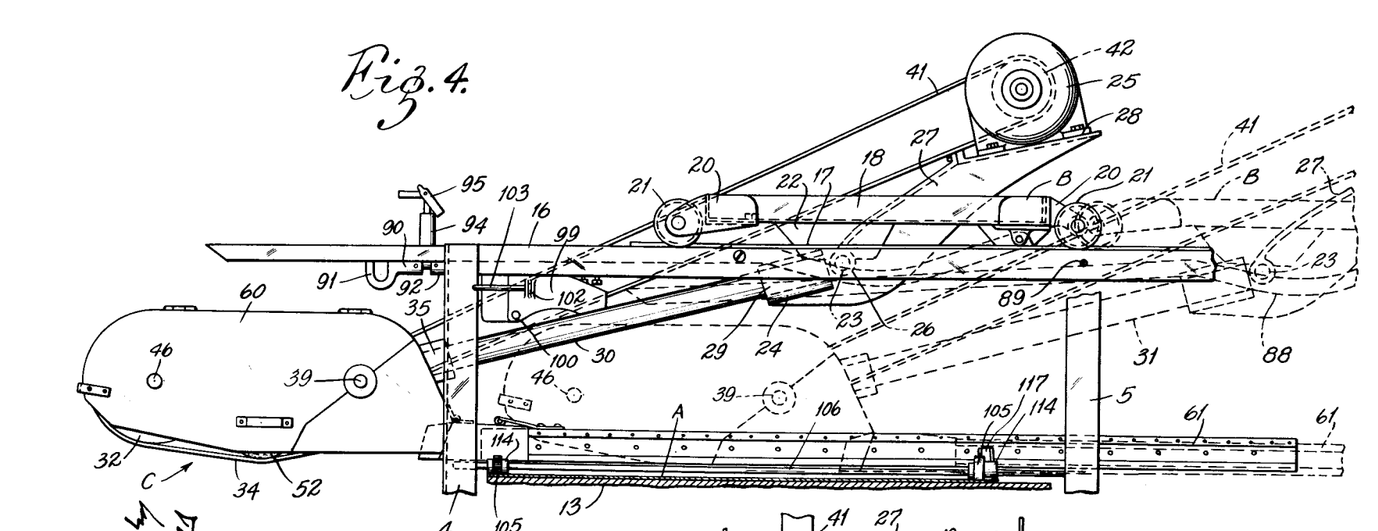
Fig. 4 is an enlarged side view of one of the individual polishing units and its supporting structure, showing the unit in its inoperative position in full lines, and in one of its normal operating positions in dotted lines.
Figure 5:
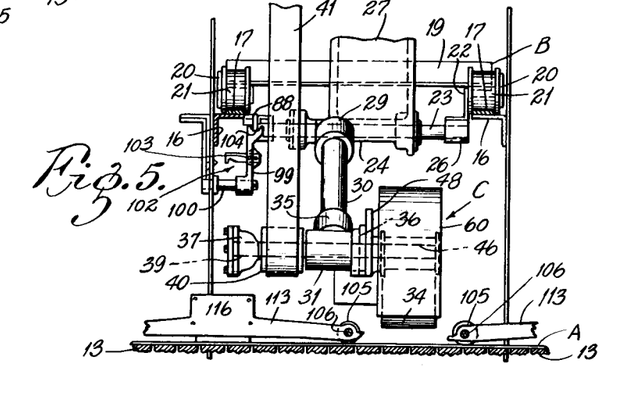
Fig. 5 is a front view of the construction shown in Fig. 4, with the top portion thereof broken away.
Figure 6:
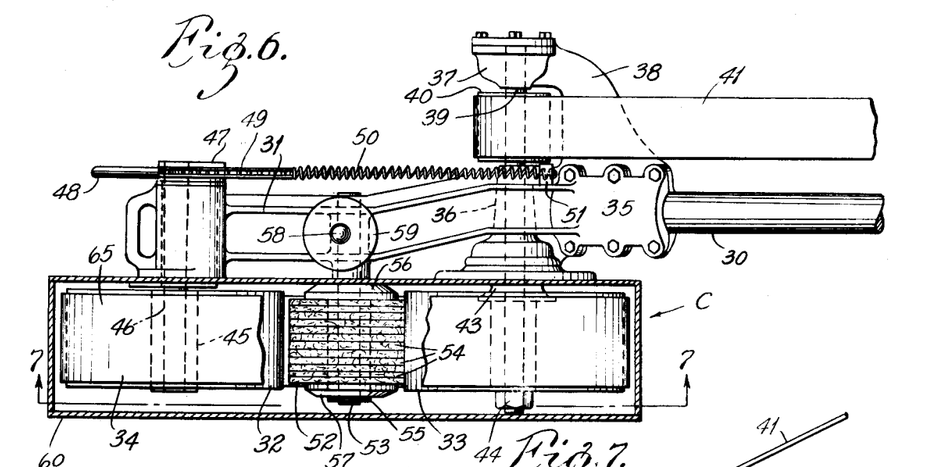
Fig. 6 is an enlarged plan view of one of the individual polishing units, with its belt covering hood shown in section.
Figure 7:
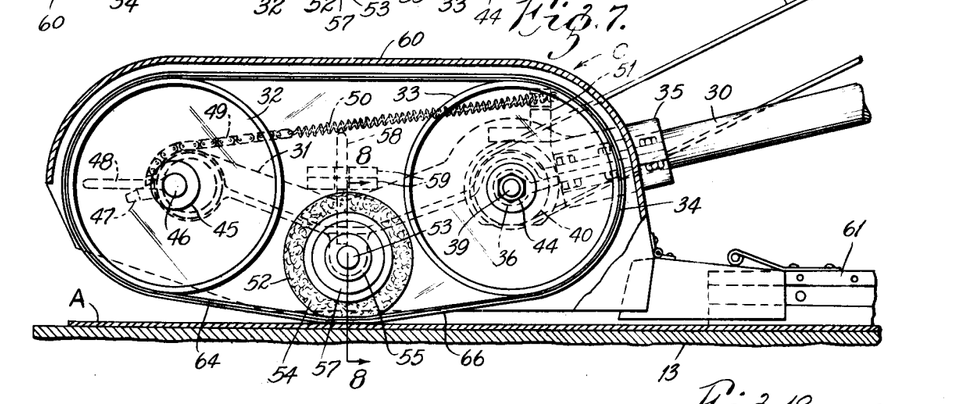
Fig. 7 is a side view of the construction shown in Fig. 6, with the hood shown in section on the line 7—7 in Fig. 6.
Figures 8, 8A, 18:
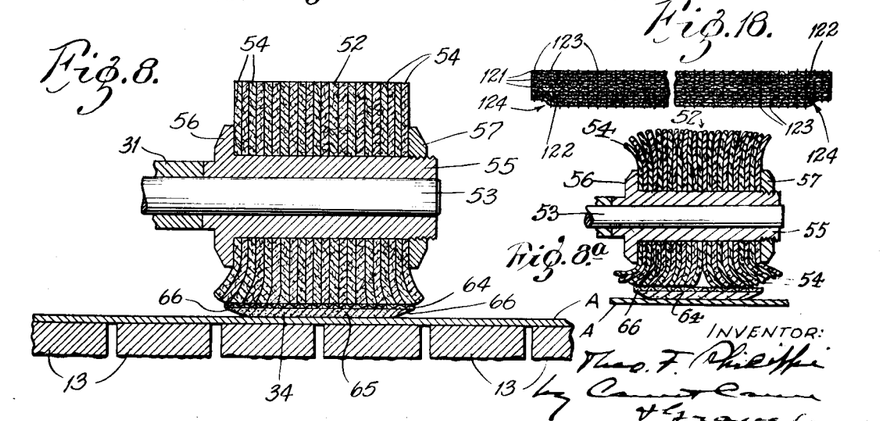
Fig. 8 is an enlarged, detail section on the line 8—8 in Fig. 7.
Fig. 8a is a diagrammatic view illustrating a portion of the idler wheel in its inoperative position.
Fig. 18 is a cross section through a modified form of polishing belt.

The polishing belt 34 comprises an inner belt portion 64 of substantial backing material, such as canvas, and an outer portion 65 of comparatively soft, compressible material, such as felt, which is secured to the inner portion of the belt. The edges of the outer layer of the belt are beveled as at 66 for preventing streaks, or the like, on the surface of the work sheet.

Figure 9:
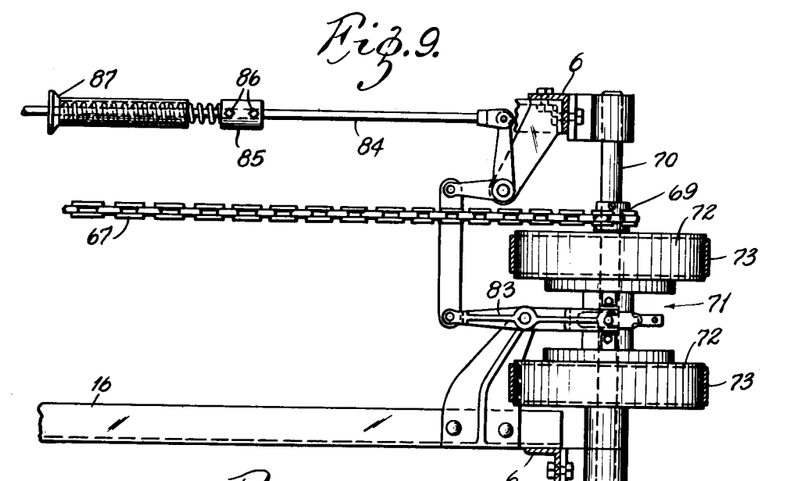
Fig. 9 is an enlarged plan view of the mechanism located at the rear end of the polishing machine framework for reciprocating the polishing unit and its supporting structure.
Figure 10:
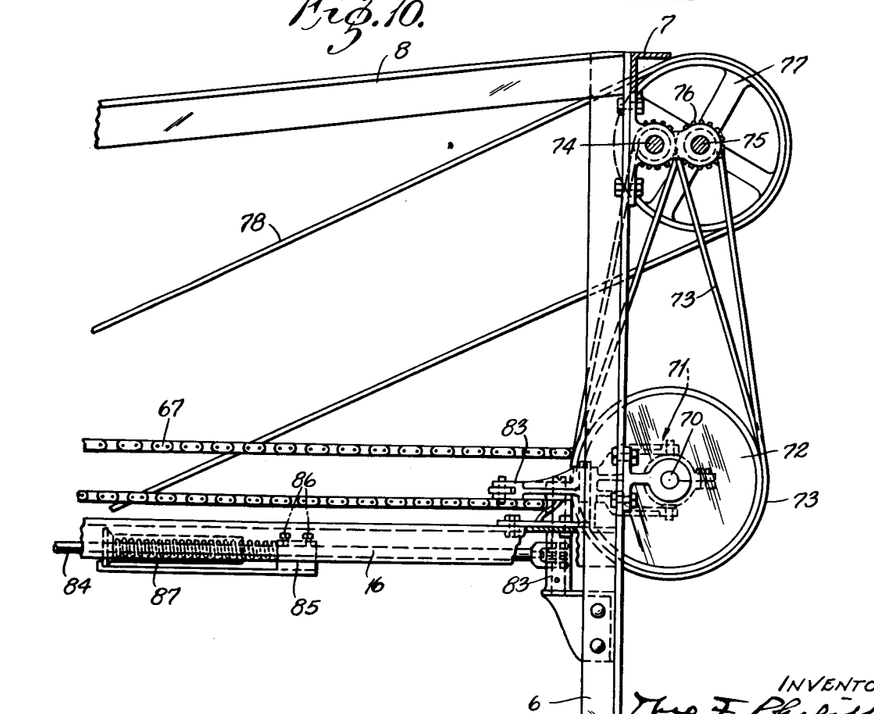
Fig. 10 is a side view of the construction shown in Fig. 9.
Figures 11, 12, 13:
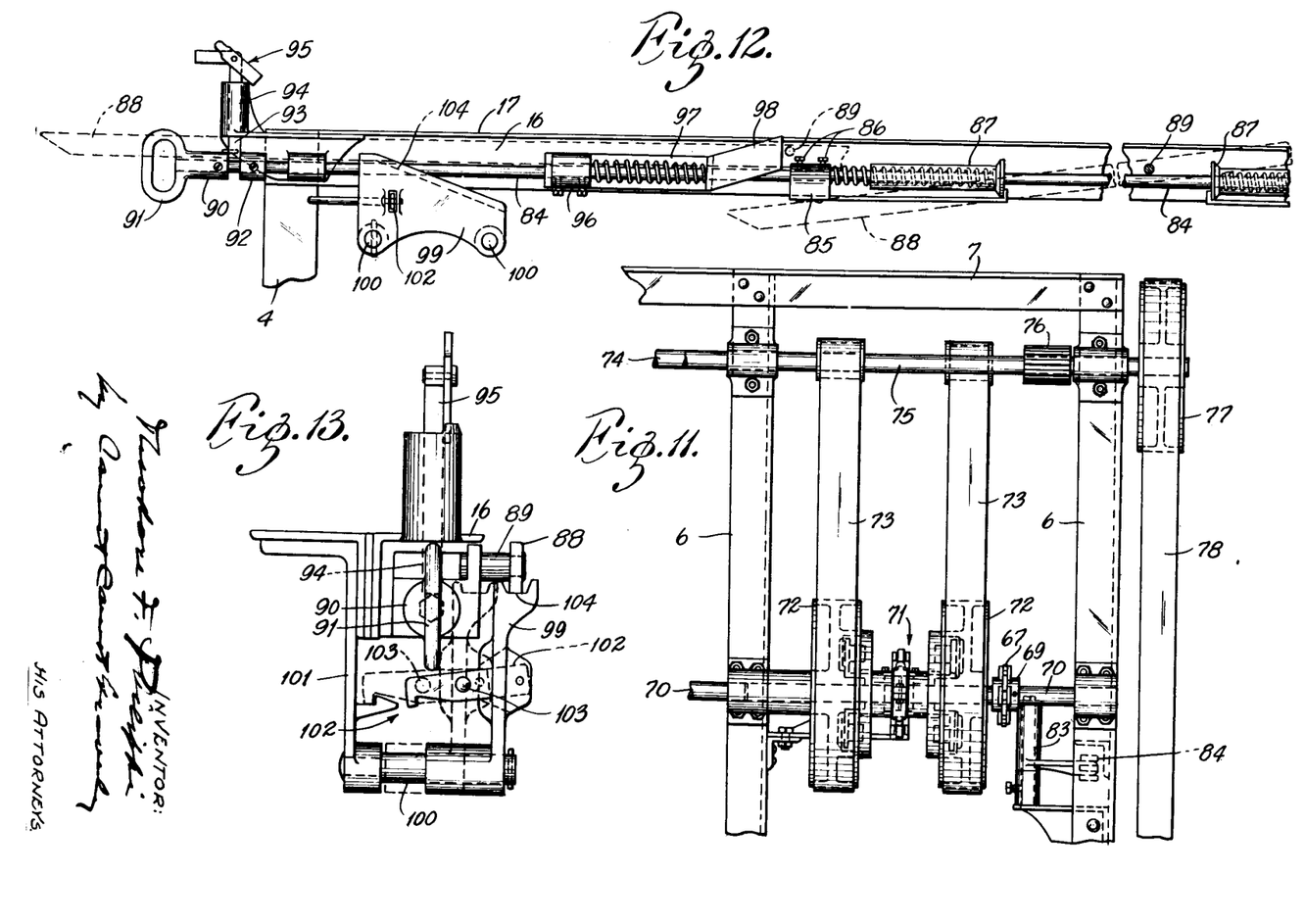
Fig. 11 is a rear view of the construction shown in Fig. 9.
Fig. 12 is an enlarged side view of the control mechanism which is actuated by the movable structure supporting the polishing unit for controlling its reciprocating movement.
Fig. 13 is a front view of the construction shown in Fig. 12.
Figure 14:
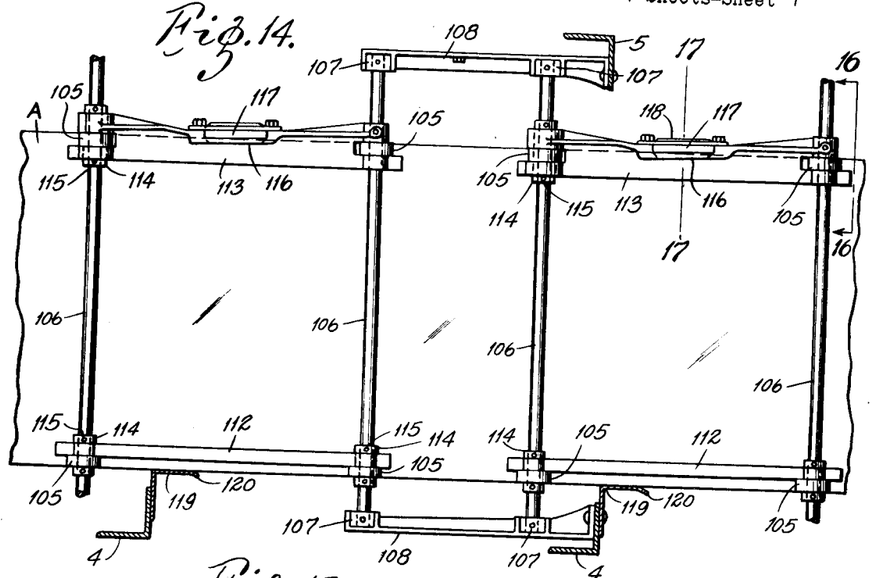
Fig. 14 is an enlarged plan view of a portion of the work carrying conveyor with a sheet to be polished thereon.
Figure 15:
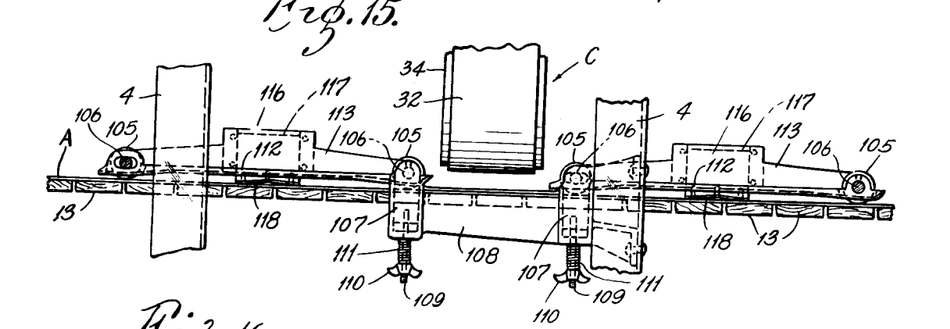
Fig. 15 is a front view of the construction shown in Fig. 14.
Figure 16:
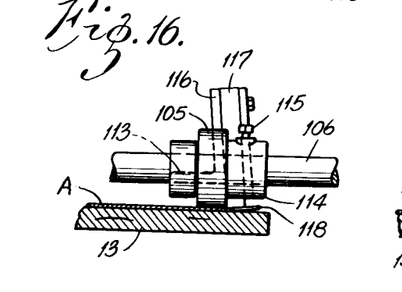
Fig. 16 is a vertical section on the line 16—16 in Fig. 14.
Figure 17:
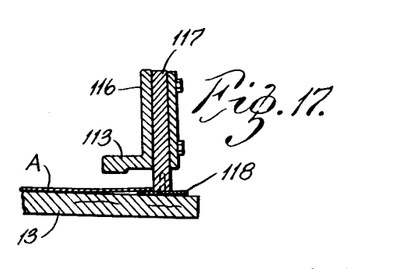
Fig. 17 is a vertical section on the line 17—17 in Fig. 14.

Each movable carriage B is operatively connected to a driving mechanism at the rear of the machine for moving it back and forth so that the polishing unit will move back and forth over the surface of the work on the conveyor. A sprocket chain 67 for moving the carriage back and forth is mounted around a sprocket wheel 68 located at the front end of the carriage tracks and a sprocket wheel 69 located at the rear end thereof, the ends of said chain 67 being attached to the front and rear end members 19, respectively, of the carriage. The rear sprocket wheel 69 is fixed on a shaft 70 mounted in bearings provided therefor on the rear uprights 6 of the polishing machine framework. This shaft 70 has a reversible clutching device 71 of standard construction mounted thereon which has one of its drums 72 connected by a belt 73 to a shaft 74 operatively connected to all of the clutching devices in this manner; and the shaft 74 is mounted in bearings on the rear uprights 6 of the machine framework near their upper ends. The other drum of the clutching device is similarly connected to another shaft 75 which is operatively connected to all of the clutching devices, the shaft 75 being mounted in bearings on the rear uprights; and the shaft 74 has a pinion gear 76 fixed thereon which meshes with a similar pinion gear fixed on the other shaft 75. The shaft 75 has a pulley wheel 77 fixed on its end which is driven by a belt 78 mounted around a pulley wheel 79 fixed on the input shaft of a variable speed transmission device 80 which is mounted on cross members 81 supported on the intermediate and rear longitudinal base members of the framework of the machine. A motor 82 is operatively connected by suitable gearing to the input shaft of the transmission device for driving the same, and the output shaft of the device is connected by suitable gearing and a gear speed reducer to one of the apron conveyor belt shafts 10 for driving the conveyor.

The actuating lever 83 of each clutching device is operatively connected by suitable levers to a control rod 84 extending alongside the path of travel of the carriage and slidably mounted on the track supporting angle 16. This control rod has a pair of rod shifting collars 85 adjustably fixed thereon by set screws 86. Each collar has an abutment member 87 extending toward the other collar; and an arm 88 is provided on the carriage which extends beyond the front end thereof and has an abutment pin 89 extending from its side in position to engage the abutment members on the rod shifting collars for shifting the control rod to actuate the reversible clutching device for reversing the direction of travel of the carriage. Obviously, the distance between the shifting collars determines the length of travel of the carriage back and forth so that by changing the position of the rod shifting collars, the machine may be readily adapted to handle work sheets of different widths.

The front end of each control rod is provided with a collar 90 having a handle 91 provided thereon for manual operation of the control rod; and means are provided for locking the control rod in a neutral position when it is desired to stop the movement of the carriage. A locking collar 92 is fixed on the control rod near the handle collar 90; and a vertically disposed pin member 93 (hereinafter termed the neutral pin) is slidably mounted in a support 94 provided therefor on the front end of the track supporting angle 16 directly above the control rod. This pin is normally held above the control rod by suitable fastening means 95; it is located in such position with respect to the control rod that when the control rod is in neutral position and the pin is unfastened, the lower end thereof will rest on the top of the control rod between the handle collar 90 and the locking collar 92 for preventing the control rod from shifting in either direction.

Provision is also made whereby each polishing unit may be brought beyond the front end of the polishing machine for the purpose of replacing the polishing belt. The pin abutment arm 88 extending from the carriage is oscillatively mounted thereon in such manner that it is free to swing upwardly from its normal position, and an auxiliary rod shifting collar 96 is secured to the control rod in front of the other rod shifting collars. This collar 96 is provided with an abutment member 97 which has an upwardly inclined end portion 98 in position to be engaged by the abutment pin 89 on the arm 88 provided on the carriage when the arm 88 is swung upwardly from its normal position; and means are provided on the side of the track supporting angle 16 near the front end thereof to cause such swinging movement of the abutment pin arm comprising a vertically disposed cam plate 99 which is slidably mounted on horizontal stub shafts 100 extending from a vertical plate 101 secured to the track supporting angle. This cam plate 99 is normally held by a latching mechanism 102 out of the path of the front end of the abutment pin arm 88. However, the cam plate 99 is provided with a handle 103 for unlatching it and moving it into the path of the abutment pin arm, and the upper edge of the cam plate is provided with an inclined groove 104 for receiving the front end of the abutment pin arm and causing it to swing upwardly as the carriage moves forward so that the abutment pin will miss the front shifting collar abutment member and allow the carriage to continue its forward movement until the abutment pin engages the auxiliary rod shifting collar abutment member.

In order to keep the work properly seated on the apron conveyor, hold-down rollers 105 are mounted on cross shafts 106 which are journaled on blocks 107 that are slidably mounted in brackets 108 fixed on the uprights on each side of the apron conveyor. Fixed on the slidable journal blocks 107 are stud screws 109 extending through the supporting brackets 108 and having wing nuts 110 on their ends with coil springs 111 interposed between said nuts and the supporting brackets. By this arrangement, the hold-down rollers 105 normally rest on top of the apron conveyor, but they are free to move upwardly to allow the work sheet to pass under them.

Front and rear longitudinal guide members 112 and 113, respectively, are mounted on each pair of cross shafts 106 between adjacent polishing units C. The front and rear guide members have openings therethrough at their ends for mounting them on the cross shafts, and said guide members are adjustably held in position on the cross shafts by means of collars 114 provided with set screws 115. The guide members have rounded end portions facing the direction of travel of the sheet for guiding the same under the hold-down rollers. Each rear longitudinal guide member has an upwardly extending flange portion 116 on its rear side which is provided with a slide-way for receiving a rectangular guide block 117. Said guide block is set at an angle with respect to the direction of travel of the conveyor, and the block slide-way is inclined toward the center of the conveyor from its lower end to its upper end. Fixed on the bottom of the guide block is a foot plate 118 which, by reason of the angular mounting of the guide block, contacts with the apron conveyor along its front edge only. Fixed on the front uprights substantially opposite each rear guide block is an angle guide member 119 provided with an outwardly inclined end portion 120 facing the direction of travel of the sheet; and with this arrangement of guide members, the edge of the sheet traveling on the conveyor slides upwardly on the foot plate of the rear guide block to engage the side of the block which causes the sheet to move laterally until its other edge engages the front guide to keep the sheet in correct position and alinement on the conveyor during its travel under the polishing units.

For certain polishing operations, the modified form of polishing belt shown in Fig. 18 may be used. This belt comprises laminations or layers 121 of endless woven fabric, such as cotton sheeting, that are folded in on both edges and sewed lengthwise by lines of stitching 123. Preferably, the second double layer of fabric 122 from the work engaging surface of the belt is not made as wide as the other layers so that when the several layers are sewed together, the stitching along the edges of the belt draws the edge portions of the engaging layer of fabric around the edges of the narrow layer of fabric to round off the edges of the belt as at 124. A belt of this type has been found to operate in a highly satisfactory manner, and it is comparatively inexpensive to make.

In the operation of the polishing machine, the sheet A to be polished is placed on the apron conveyor belt and slowly carried thereby under the polishing units C which move continuously back and forth over the surface of the sheet. As the sheet passes under each polishing unit, a portion of the lower reach of the polishing belt 34, which is driven at a comparatively high rate of speed, is pressed against the surface of the sheet by the buffer wheel 52. As the buffer wheel is made out of comparatively yieldable material, its peripheral portion which engages the polishing belt flattens out so as to press a considerable surface portion of the belt flat against the surface of the work sheet and also allow the belt to shape itself to conform to the shape of the surface of the work sheet so that an even polishing action is obtained at all points of contact between the belt and the sheet. Moreover, the soft, compressible outer polishing portion 65 of the polishing belt is sufficiently yieldable that it responds to slight irregularities in the surface of the work sheet to insure an even polishing action; and it has been found that, even though the sheets may buckle slightly due to the heat created by the friction between the polishing belt and the sheet, the belt is able to conform to the changes in the shape of the surface of the sheet to produce an even, brilliant luster thereon without leaving any "burned spots" or "streaks", or the like.

The hereinabove described polishing machine is readily capable of polishing stainless steel plates which are extremely difficult to polish, and it produces an even luster over the entire surface of such sheets.

With the polishing machine, the polishing belt 34 is readily removed from one of the polishing units without interfering with the continuous operation of the others. This is accomplished by unfastening the neutral pin 93 located at the front end of the control rod 84 which actuates the clutching mechanism 71 of the particular polishing unit C whose belt is to be replaced and letting the pin slip downwardly until it rests on the top of the handle collar 90. During this unfastening operation, the handle 103 of the adjacent cam plate 99 at the front end of the carriage tracks is operated to release the cam plate latch and to move the cam plate laterally into the path of the pin abutment arm extending from the carriage. As the carriage B moves forward, the front end of the pin abutment arm 88 engages the inclined groove 104 in the cam plate which swings the arm 88 upwardly so that the abutment pin 89 thereon will not engage, but will pass over the front main shifting collar abutment member on the control rod, which allows the carriage to move forward until the abutment pin strikes the auxiliary rod shifting collar abutment member 97 to shift the control rod forward; and when the rod reaches its neutral position, the neutral pin falls into the space between the handle and the locking collar which stops the movement of the carriage. With the carriage in this position, the polishing unit extends beyond the front end of the machine in a convenient place for changing its polishing belt. In order to remove the belt, the hood 60 is folded back, and the coil spring 50 attached to the radial arm 48 of the pin 45 supporting the front polishing belt pulley wheel shaft is unfastened which allows the eccentric shaft 46 to move around with the pin member 45. This change in position of the belt pulley relieves the tension on the polishing belt so that it can be readily removed and replaced by another. The polishing unit may then be put back into operation by unlocking the control rod and by pulling the control rod outwardly by its handle, which actuates the clutching mechanism to start the carriage to move rearwardly, after which the cam plate is slid back and latched in its normal position.

Obviously, the polishing machine hereinabove described admits of considerable variations without departing from the spirit of my invention. Accordingly, I do not wish to be limited to the precise construction shown and described.

What I claim is:

1. A polishing machine comprising a framework, a work carrying conveyor mounted in said framework, rails provided on said framework, a carriage having wheels for running on said rails, a structure pivoted on said carriage, a pulley supporting member provided at one end of said structure, a motor provided at the other end of said structure, a drive pulley shaft journaled on said pulley supporting member, and driven by said motor, a drive pulley fixed on said drive pulley shaft, an idler pulley mounted on said pulley supporting member, a polishing belt mounted around said drive pulley and said idler pulley, an idler buffer wheel mounted on said pulley supporting member between the other pulleys for pressing a portion of said polishing belt against the surface of the work on the conveyor, and means for moving said carriage back and forth.

2. A polishing machine comprising means for supporting the work to be polished, a movable carriage, a lever arm structure pivoted thereon and carrying a polishing unit at one end including a polishing belt adapted to engage the work, said arm structure at its other end supporting a motor for driving said unit, and means for reciprocating said carriage to cause the polishing unit to move relative to the work.

3. A polishing machine comprising a work supporting conveyor, a carriage movable transversely of said conveyor, a lever arm structure pivoted for vertical swinging movement on said carriage, a work polishing unit mounted on one arm of said lever, a motor on the other arm of said lever structure for driving said polishing unit said motor tending to counterbalance the weight of said work polishing unit, and means for actuating said carriage and said conveyor.

4. A polishing machine comprising a work supporting conveyor, a carriage movable transversely of said conveyor, a lever arm structure pivoted on said carriage, a work polishing unit mounted on one arm of said lever, a motor on the other arm of said lever structure for driving said polishing unit, and a weight removably secured to the supporting arm for the polishing unit for regulating the pressure of said unit on the work.

5. A polishing machine comprising a plurality of carriages, a polishing unit carried by each carriage, means for reciprocating said carriages, and means associated with the carriage reciprocating means and operable during the operation of said carriages for causing any one of said carriages to move beyond the normal range of reciprocating movement of said carriage and stopping it in such position without stopping the continuous operation of the other carriages.

6. A polishing machine comprising a conveyor for carrying the work to be polished, a plurality of polishing units adapted to move back and forth over the surface of the work on the conveyor, cross shafts extending above the work, rollers provided on said cross shafts for holding the work down on said conveyor, and guide members mounted on said cross shafts and provided with rounded end portions facing the direction of travel of the work for causing the same to pass under the hold-down rollers.

7. A polishing machine comprising means for supporting the work to be polished, a polishing belt for engaging the work, and a wheel for pressing a portion of said belt against the work, said belt having its edge portions thinner than its other portions.

8. In a polishing machine, a polishing belt comprising a plurality of layers of fabric, one of said layers being narrower than others, and means for holding said layers together along their edges whereby the edge portion of the belt is narrower than its central portion.

9. A polishing machine comprising means for supporting the work to be polished, a polishing belt adapted to cooperate with the work, and a wheel for pressing a portion of said belt against the work, said polishing belt comprising a plurality of layers of cloth fabric, one of said layers near the work engaging layer being narrower than the work engaging layer, and said layers being held together by lines of stitching extending lengthwise of the belt.

10. A polishing machine comprising a polishing belt and a wheel for backing up the work-engaging portion of said belt, said wheel being characterized by freedom from inherent stability, whereby said wheel under the influence of centrifugal force exerts substantially radial but yielding pressure on the portion of the belt engaged thereby.

11. A polishing machine comprising means for supporting the work to be polished, an endless work polishing belt, and an idler wheel for pressing a portion of one of the stretches of said belt against the work, said wheel being characterized by freedom from inherent stability, whereby said wheel under the influence of centrifugal force exerts substantial radial but yielding pressure on the portion of the belt engaged thereby.

12. A polishing machine comprising a support for the work to be polished, an endless work polishing belt, a pair of pulleys for supporting and driving said belt, and an idler wheel for pressing one of the stretches of said belt against said work, said wheel being characterized by freedom from inherent stability, whereby said wheel under the influence of centrifugal force exerts substantially radial but yielding pressure on the portion of the belt engaged thereby.

13. A polishing machine comprising a polishing belt, and a wheel for backing up the work engaging portion of said belt, said wheel comprising a series of independently flexible disks secured together at their central portions only, whereby said wheel is characterized by freedom from inherent stability and is adapted under the influence of centrifugal force to exert a substantially radial but yielding pressure on the belt.

14. A polishing machine comprising a support for the work to be polished, an endless work polishing belt, pulleys for supporting and driving said belt, and an idler wheel for pressing one of the stretches of said belt against the work, said idler wheel comprising a multiplicity of independent single-ply fabric disks secured together at their central portions only, whereby said wheel is characterized by freedom from inherent stability and is adapted under the influence of centrifugal force to exert a substantially radial but yielding pressure on said belt.

THEODORE F. PHILIPPI.